United States Patent [19]

Tyler et al.

[11] 4,299,711

[45] Nov. 10, 1981

[54] SURFACTANT WATERFLOODING ENHANCED OIL RECOVERY PROCESS

[75] Inventors: Timothy N. Tyler; Jack H. Park, both of Houston, Tex.

[73] Assignee: Texaco Inc., White Plains, N.Y.

[21] Appl. No.: 99,947

[22] Filed: Dec. 3, 1979

[51] Int. Cl.³ .............................................. E21B 43/22
[52] U.S. Cl. .............................. 252/8.55 D; 166/252; 166/275
[58] Field of Search ................... 252/8.55 D; 166/275, 166/252

[56] References Cited

U.S. PATENT DOCUMENTS

| | | | |
|---|---|---|---|
| 3,500,923 | 3/1970 | Reisberg | 166/275 X |
| 3,827,497 | 8/1974 | Dycus et al. | 166/275 X |
| 4,018,278 | 4/1977 | Shupe | 252/8.55 X |
| 4,066,124 | 1/1978 | Carlin et al. | 166/275 X |
| 4,077,471 | 3/1978 | Shupe et al. | 166/275 |
| 4,088,189 | 5/1978 | Shupe | 166/275 X |
| 4,110,228 | 8/1978 | Tyler et al. | 252/8.55 |

Primary Examiner—Herbert B. Guynn
Attorney, Agent, or Firm—Carl G. Ries; Robert A. Kulason; Jack H. Park

[57] ABSTRACT

Disclosed is an improved surfactant waterflooding enhanced oil recovery process employing a fluid containing as substantial in the only anionic surfactant, an ethoxylated and sulfated or ethoxylated and sulfonated surfactant. The degree of ethoxylation of the surfactant is determined by determining the degree of ethoxylation which produces the first inflection point in the electrical conductivity of a fluid as the degree of ethoxylation is increased from a value below that which causes solubility of the fluid in the aqueous environment in which it is tested to a value slightly greater than borderline solubility. Optimum results are obtained if the average degree of ethoxylation of the ethoxylated and sulfated or ethoxylated and sulfonated surfactant is from $n-0.2$ to $n+0.1$ and preferably from $n-0.15$ to $n+0.05$, where n is the degree of ethoxylation corresponding to the first inflection point in electrical conductivity.

14 Claims, 1 Drawing Figure

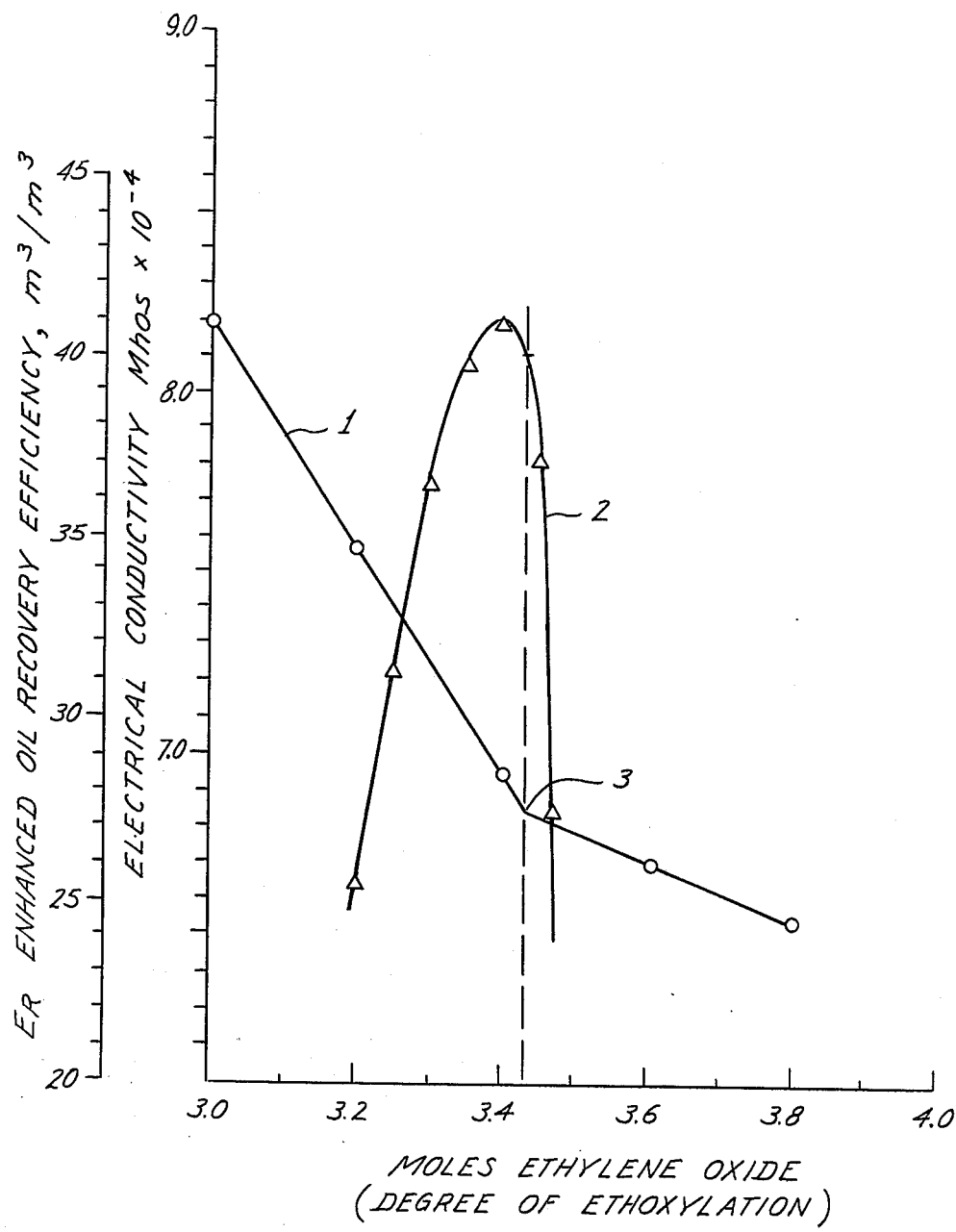

SURFACTANT WATERFLOODING ENHANCED OIL RECOVERY PROCESS

FIELD OF THE INVENTION

This invention concerns a novel surfactant waterflooding enhanced oil recovery process.

BACKGROUND OF THE INVENTION

The normal sequence for recovering petroleum from subterranean petroleum deposits ordinarily comprises a first phase, referred to as primary recovery, in which petroleum is recovered by pumping or permitting the petroleum to flow to the surface of the earth through wells penetrating the formation and in fluid communication therewith, utilizing natural energy within the petroleum reservoir. Once this phase is completed, a secondary production phase is frequently applied, in which water is injected into the formation via an injection well in communication therewith, which displaces petroleum through the formation to another, remotely located well from which it flows to the surface of the earth. While waterflooding recovers an additional quantity of oil economically, water does not displace petroleum efficiently, since water and oil are immiscible and the interfacial tension between water and oil in quite high. Accordingly, as much as 70 percent of the oil originally present in the formation is commonly left even after completion of waterflooding operations.

The use of surfactant waterflooding has been discussed in many prior art references, and numerous field trials have been undertaken employing surfactant-containing fluids. Petroleum sulfonates and other simple organic sulfonate anionic surfactants may be employed in very low salinity formations, but many petroleum formations contain water whose salinity exceeds the level in which petroleum sulfonates may be employed advantageously.

Prior art references suggest the use of surfactants which are both ethoxylated and sulfated or ethoxylated and sulfonated in high salinity environments. Numerous references suggest the injection of a complex mixture of simple anionic surfactants such as petroleum sulfonate and more soluble surfactants such as ethoxylated and sulfated or ethoxylated and sulfonated surfactants. While laboratory tests indicate such complex mixtures effectively displace petroleum in the presence of high salinity water, field application has frequently been disappointing for a number of reasons. One reason for failure of the multi surfactant-containing fluids is related to the different rates of adsorption of the disimilar surfactants from the aqueous fluid as the fluid passes through the subterranean earth formation. Since optimum performance of a multi component surfactant system is achieved only when the various surfactant species are present in a critical ratio, differential adsorption necessarily changes the ratio of the surfactants and therefore renders the fluid less effective or completely ineffective for low surface tension displacement of petroleum. The use of essentially single surfactant fluids, in which the surfactant is an ethoxylated and sulfated or ethoxylated and sulfonated surfactant is also suggested in the prior art, but it has heretofore been difficult to compound a fluid containing substantially only one surfactant which is effective under high salinity conditions for recovering oil from subterranean deposits thereof.

In view of the serious current shortage of petroleum and shortcomings of the prior art techniques, it can be appreciated that there is a significant need for a surfactant waterflooding oil recovery method employing a fluid containing essentially a single surfactant species which efficiently displaces oil from subterranean deposit thereof.

DESCRIPTION OF THE PRIOR ART

U.S. Pat. No. 4,018,278 describes an oil recovery process employing an ethoxylated and sulfonated surfactant as substantially the only surfactant present in the surfactant fluid.

U.S. Pat. No. 4,088,189 describes an oil recovery process employing an ethoxylated and sulfonated surfactant of a particular degree of ethoxylation, the fluid being heated prior to injecting it into the formation.

U.S. Pat. No. 4,077,471 describes a surfactant waterflooding oil recovery process employing a fluid containing an ethoxylated and sulfonated surfactant in combination with a water insoluble nonionic surfactant as a phase stabilizing additive.

U.S. Pat. No. 4,110,228 describes an oil recovery process employing a fluid containing an ethoxylated and sulfonated surfactant in combination with petroleum sulfonate or other organic sulfonate, where the ratio of ethoxylated and sulfonated surfactant to petroleum sulfonate corresponds to the ratio which produces the first inflection point in electrical conductivity as the ratio is changed from a value at which the mixture is insoluble to a value at which the mixture is soluble in the aqueous environment.

SUMMARY OF THE INVENTION

We have discovered a method for recovering petroleum from subterranean deposits thereof by surfactant waterflooding enhanced oil recovery process using an aqueous fluid containing essentially a single surfactant which is carefully tailored to produce optimum performance results even in high salinity formations, e.g., in formations containing water having salinities from 20,000 to 240,000 parts per million total dissolved solids. The surfactant contained in the aqueous surfactant fluid is an ethoxylated and sulfated or ethoxylated and sulfonated surfactant. Specifically, the surfactant of choice in our process may be an ethoxylated and sulfonated surfactant having the following formula:

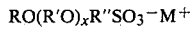

$$RO(R'O)_x R''SO_3^- M^+$$

in which R is an alkyl radical, branched or linear, containing from 8 to 24 and preferably 10 to 20 carbon atoms, or an alkylaryl such as benzene, toluene or xylene having attached thereto at least one alkyl chain containing from 6 to 20 and preferably from 7 to 15 carbon atoms in the alkyl chain, R' is ethylene or a mixture of ethylene and propylene or other higher alkylene with relatively more ethylene than propylene, x is a number representing the average degree of ethoxylation whose value is from 2 to 10 and preferably from 2.5 to 8, R'' is alkylene, propylene, hydroxy propylene or butylene, O is oxygen, S is sulfur, and M is a monovalent cation such as sodium, potassium, lithium or ammonium.

Alternatively, the surfactant may be an ethoxylated and sulfated surfactant having the following formula:

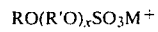

$$RO(R'O)_x SO_3 M^+$$

wherein R, O, R', x, S and M have the same meaning as above.

The value x is determined for the above surfactant, is identified by first determining the degree of ethoxylation, (n) which produces the first inflection point in the electrical conductivity as a degree of ethoxylation is increased from a value at which the surfactant is essentially insoluble in the aqueous fluid in which it is being tested, to a value exceeding the borderline solubility of the surfactant. The degree of ethoxylation of the surfactant actually employed in the surfactant fluid, x in the above formula, has a value from $n-0.2$ to $n+0.1$ and preferably in the range from $n-0.15$ to $n+0.05$ where n is the degree of ethoxylation corresponding to the above described electrical injection point.

BRIEF DESCRIPTION OF THE DRAWING

The enclosed drawing illustrates the change in electrical conductivity of an ethoxylated and sulfonated surfactant with change in the degree of ethoxylation thereof, and the enhanced oil recovery effectiveness resulting from use of the ethoxylated and sulfonated surfactants in a single surfactant-containing fluid in a high salinity water-containing core flood experiment.

DESCRIPTION OF THE PREFERRED EMBODIMENTS

Our invention concerns an improved surfactant waterflooding oil recovery process suitable for use in high salinity formations, e.g., formations containing water or brine whose salinity is from 20,000 to 240,000 parts per million total dissolved solids, which formation brines frequently also contain high concentration of divalent ions such as calcium and magnesium in the range from 1000 to 20,000 parts per million. The surfactant fluid is ordinarily compounded to have about the same salinity as the formation water, usually in the range from 50 to 100% and preferably from 75 to 100% of the salinity of the water present in the formation. The surfactant fluid ordinarily contains essentially only one anionic surfactant, e.g., our invention is not concerned with surfactant fluids using a primary anionic surfactant such as an organic sulfonate including petroleum sulfonates in combination with a more soluble surfactant as a solubilizing co-surfactant. Rather, the surfactant fluid will contain only one anionic surfactant which will be either an ethoxylated and sulfonated surfactant or an ethoxylated and sulfated surfactant. Specifically, one preferred surfactant for use in our process is an alkylpolyalkoxyalkylene sulfonate or alkylarylpolyalkoxyalkylene sulfonate having the following formula:

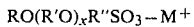

wherein R is an alkyl, linear or branched, having from 8 to 24 and preferably from 10 to 20 carbon atoms, or an alkylaryl such as benzene, toluene or xylene having attached thereto at least one alkyl group, linear or branched and containing from 6 to 18 and preferably from 7 to 15 carbon atoms in the alkyl chain, R' is ethylene or a mixture of ethylene and higher alkylene such as propylene with relatively more ethylene than higher alkylene, x is a number representing the average number of alkoxy units in the surfactant, in the range from 2 to 10 and preferably from 2.5 to 8, R" is ethylene, propylene, hydroxy propylene or butylene, O is oxygen, S is sulfur, and M is a monovalent cation, preferably sodium, potassium, lithium or ammonium.

The other preferred surfactant which may be employed in the process of our invention is an ethoxylated and sulfated surfactant, specifically an alkylpolyalkoxy sulfate or an alkylarylpolyalkoxy sulfate having the following formula:

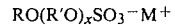

wherein R, O, R', x, S and M have the same meaning as above.

In a normal embodiment, the above-described surfactant will be substantially the only surfactant present in the surfactant fluid. In this embodiment, the concentration of the above-described surfactant will be in the range from 0.1 to 10.0 and preferably from 0.5 to 5.0 percent by weight. The pore volume of surfactant fluid employed is about the same as is conventionally used in state-of-the-art surfactant waterflooding oil recovery processes, which is from 0.1 to 1.0 and preferably from 0.2 to 0.5 pore volumes based on the pore volumes of formation through which the injected fluids will pass.

The essence of our invention is concerned with the precise formulation of the surfactant for a particular application. Specifically, the value of x in the above formula for any particular value of R will, in any given salinity, be very critical in the performance of the surfactant waterflood oil recovery process. Prior art references describing the use of this surfactant have not heretofore recognized the criticality of the value of x. We have found that the oil recovery effectiveness is extremely sensitive to small variations in the value of x, or more precisely in the balance between the degree of ethoxylation, x, and the length of the alkyl group and the alkyl or alkylaryl chain which comprises the oil-soluble portion of the surfactant described above.

Our process involves determining the variation in electrical conductivity of aqueous fluids having salinity equal to the salinity of the surfactant fluid which will be employed in the surfactant waterflood oil recovery process, and containing a predetermined concentration of ethoxylated and sulfated or ethoxylated and sulfonated surfactant, with variations in the value of x. Both salinity and surfactant concentration are held constant, and the degree of ethoxylation of the surfactant is varied over a range that includes values for degree of ethoxylation in which the surfactant is only partially soluble in the aqueous fluid in which it is dispersed, and includes values for x, the degree of ethoxylation, which are greater than the minimum amount which just renders the surfactant soluble in the aqueous fluid. The variation in electrical conductivity of fluids containing the surfactant of varying degrees of ethoxylation is determined, and the first inflection point, which will also be in the range of borderline solubility of the surfactant, is identified. The surfactant employed in the fluid used in the process of our invention should have a degree of ethoxylation in a range corresponding to the inflection point in electrical conductivity. We have found that optimum recovery efficiency is obtained if the value of x in the above formula is from $n-0.2$ to $n+0.1$ and preferably in the range from $n-0.15$ to $n+0.05$, wherein n is the degree of ethoxylation corresponding precisely to the first inflection point in the electrical conductivity function.

The above calculation will frequently result in identifying a value for n which is a fractional number, and this will of course be satisfied by blending together varying amounts of ethoxylated and sulfated or ethoxylated and sulfonated surfactants differing from one another by 1 or 2 in the value of degree of ethoxylation. Specifically, if the above formula indicates that the preferred degree of ethoxylation for a particular application is 3.5, then the preferred surfactant is comprised of a mixture of ethoxylated and sulfated or ethoxylated and sulfonated surfactants, in which approximately equal molar amounts of surfactants whose degee of ethoxylation is 3.0 and 4.0, are blended together. The materials blended may in fact themselves contain small amounts of species having average degrees of ethoxylation greater and less than the average numbers, and so the resultant blend may comprise mixtures of sulfated and ethoxylated or sulfonated and ethoxylated surfactants with degrees of ethoxylation varying over a range of 2 or 3 or more units. Nevertheless, the precise value of the average degree of ethoxylation is very critical to the oil recovery effectiveness, as will be shown below.

In one slightly different embodiment of the process of our invention, another component is utilized in combination with the ethoxylated and sulfated or ethoxylated and sulfonated surfactant. This material is a low HLB, essentially water-insoluble nonionic surfactant which is used for the purpose of improving the phase stability of the surfactant-containing fluid. Preferred nonionic surfactants for this purpose are ethylene oxide adducts of alkanols and alkylphenols having about the same degree of ethoxylation as the ethoxylated and sulfated or ethoxylated and sulfonated surfactant with which they are used. Since the solubility of the ethoxylated and sulfated or ethoxylated and sulfonated surfactant molecule results from both the ethoxy chain and the anionic portion of the molecule, the unsulfated or unsulfonated nonionic surfactant are essentially insoluble at the salinity levels employed in the fluids of our oil recovery process. The insoluble nonionic surfactant does, however, stabilize the mixed micells in which the surfactant molecules are usually arranged in an aqueous surfactant fluid.

EXPERIMENTAL SECTION

For the purpose of disclosing fully how the process of our invention is employed, and for the purpose of illustrating the magnitude of results achieved in application of our teachings, the following laboratory work was performed.

In the course of conducting laboratory experiments to design a surfactant waterflood for a field trial being studied, it was determined that a sodium dodecylbenzenepolyethoxyethylene sulfonate was a particularly preferred surfactant because of the salinity and temperature of the formation for which the tests were being conducted. This particular formation contained water whose salinity was about 115,000 parts per million total dissolved solids, and the formation temperature was about 100° F. (37.8° C.).

A series of 10 samples of the dodecylbenzenepolyethoxyethylene sulfonate, sodium salt were formulated by blending laboratory synthesized samples in different ratios. The blends were prepared from samples, one of which had an average degree of ethoxylation of about 3 and the other of which had an average degree of ethoxylation of about 5. In all of the tests described below, aqueous solutions were prepared having salinity of about 115,000 parts per million total dissolved solids, each solution containing 2.15 percent by weight of the dodecylbenzenepolyethoxyethylene sulfonate. The only difference between the solutions was in the average degree of ethoxylation of the surfactant present therein. The electrical conductivity was measured over a range of degree of ethoxylation from about 3 to about 4.2. The values are shown graphically on the attached figure as Curve 1, and it can be seen that the inflection point 3 corresponds to an average degree of ethoxylation of about 3.42. This inflection point also defines a region of borderline solubility which corresponds to degree of ethoxylation from about 3.4 to about 3.5. One embodiment of our proces would comprise using a fluid having surfactant whose degree of ethoxylation was within the range of borderline solubility and corresponded to the inflection point of electrical conductivity, 3.42 in this example, and indeed our experiments indicate that good oil recovery is obtained using such a surfactant.

We have discovered that by very carefully determining the oil recovery effectiveness of aqueous, saline fluids containing a single ethoxylated and sulfonated surfactant species, that the oil recovery effectiveness may be improved somewhat if the degree of ethoxylation is carefully adjusted to a value within a narrow range which is numerically related to the degree of ethoxylation corresponding to the first inflection point in the electrical conductivity.

A series of laboratory experiments comprising core floods were performed using aqueous, saline solutions containing single surfactants, specifically the dodecylbenzenepolyethoxyethylene sulfonate described above. Surfactants having degree of ethoxylation in the range from about 3.2 to about 3.5 were formulated, and several separate core floods were performed to measure the oil recovery effectiveness of single surfactant fluids containing species within this range. The oil recovery efficiency results are shown graphically as Curve 2 of the attached FIGURE, and it can be seen an extreme change in oil recovery effectiveness occurred as the degree of ethoxylation of the surfactant is increased from 3.2 to an optimum value of about 3.40 to 3.42, followed by an even more rapid decline in oil recovery effectivenss as the degree of ethoxylation increases toward about 3.5. The oil recovery effectiveness of a fluid containing a surfactant whose degree of ethoxylation corresponds exactly to the inflection point 3 of electrical conductivity curve 1 would indeed be satisfactory and would produce oil recovery in the range of about 40 percent. It can be seen, however, that this is not the maximum oil recovery effectiveness obtained, and indeed the maximum recovery was obtained using a surfactant whose degree of ethoxylation was about 3.40 to 3.42. We have found that once the degree of ethoxylation n corresponding to the first inflection point in electrical conductivity is determined, the operable range of the surfactant fluid corresponds to a degree of ethoxylation from $n-0.2$ to $n+0.1$, and optimum results are obtained in the preferred range of degree of ethoxylation which is from $n-0.15$ to $n+0.05$. The fact that the optimum results are obtained in this example using a surfactant whose degree of ethoxylation is slightly less than the degree of ethoxylation corresponding precisely to the inflection point and borderline solubility was somewhat surprising, and the extent of improvement in oil recovery effectiveness achieved as a result of using the optimum results was also surprising.

Another series of experiments were performed using precisely the same surfactant fluids as described above to displace oil from a core having substantially lower clay content. Because of the lower clay content, loss of surfactant from the fluid due to adsorption by the core material was less of a problem. Oil recovery efficiencies were obtained using surfactants of differing degrees of ethoxylation. The results are given in Table I below. The surfactant used in all instances was a sodium dodecylbenzenepolyethoxyethylene sulfonate and the surfactant fluid salinity was 115,000 parts per million.

TABLE I

OIL RECOVERY TESTS

| Degree of Ethoxylation | $E_R$, Oil Recovery Efficiency, $m^3/m^3$ |
|---|---|
| 3.40 | 50.0 |
| 3.43 | 58.0 |
| 3.44 | 63.0 |
| 3.47 | 85.5 |
| 3.50 | 64.0 |
| 3.70 | 47.0 |

It can be seen that the change in $E_R$ is even sharper in the above example than in the one described earlier. Also, in this instance, the maximum oil recovery occurred at degree of ethoxylation value equal to 3.47, which is equal to n+0.05 where n is the degree of ethoxylation at the inflection point of the electrical conductivity curve.

While our invention has been described in terms of a number of illustrative embodiments, it is clearly not so limited since many variations thereof will be apparent to persons skilled in the art of oil recovery without departing from the true spirit and scope of our invention. It is our intention and desire that our invention be limited and restricted only by those limitations and restrictions appearing in the claims appended immediately hereinafter below.

We claim:

1. In a method of recovering petroleum from a subterranean, petroleum-containing formation penetrated by at least one injection well and by at least one spaced-apart production well, comprising injecting into the formation an aqueous fluid containing, as the sole anionic surfactant, an ethoxylated and sulfonated surfactant having the following formula:

RO(R'O)$_x$R"SO$_3^-$M$^+$ 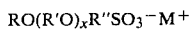

wherein R is an 8 to 24 carbon atom alkyl group or an alkylaryl consisting of benzene, toluene, or xylene having attached thereto at least one 6 to 18 carbon atom alkyl group; R' is ethylene or a mixture of ethylene and higher alkylene with relatively more ethylene than higher alkylene; x is a number representing the average number of alkoxy units in the range from 2 to 10; R" is ethylene, propylene, hydroxypropylene, or butylene; O is oxygen; S is sulfur; and M is a monovalent cation; or an ethoxylated and sulfated surfactant having the following formula:

RO(R'O)$_x$SO$_3^-$M$^+$ 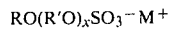

wherein R, O, R', x, S, and M have the same meaning as above, said surfactant fluid displacing petroleum through the formation to the producing well from which it is recovered to the surface of the earth, the improvement for determining the precise value of x which comprises:

(a) preparing a series of aqueous fluids having constant salinity and surfactant concentration, the salinity value being about the same as the salinity of the water present in the formation, the samples containing surfactant of varying degrees of ethoxylation, (b) measuring the electrical conductivity of the samples, (c) creating a graphical representation of electrical conductivity versus degree of ethoxylation, (d) identifying the degree of ethoxylation corresponding to the first inflection point in the electrical conductivity versus the degree of ethoxylation curve as the degree of ethoxylation is decreased from a value less than the degree of ethoxylation which causes solubilization of the surfactant in the aqueous saline fluid to a value greater than the minimum degree of ethoxylation which accomplishes solubization, and (e) employing as said sole anionic surfactant one in which the average degree of ethoxylation is numerically from 0.2 less that to 0.1 greater than the degree of ethoxylation corresponding to said first inflection point of electrical conductivity.

2. A method as recited in claim 1 wherein the value of the degree of ethoxylation of the surfactant is from n−0.15 to n+0.05.

3. A method as recited in claim 1 wherein the surfactant is said ethoxlated and sulfonated surfactant and M$^+$ is a monovalent cation selected from the group consisting of sodium, potassium, lithium and ammonium.

4. A method as recited in claim 3 wherein R is an alkyl having from 10 to 20 carbon atoms.

5. A method as recited in claim 3 wherein R is an alkylaryl consisting of benzene, toluene or xylene having attached thereto at least one C$_7$ to C$_{15}$ alkyl group.

6. A method as recited in claim 3 wherein R' is ethylene.

7. A method as recited in claim 3 wherein the value of x is from 2.5 to 8.0.

8. A method as recited in claim 1 wherein said ethoxylated and sulfated or ethoxylated and sulfonated surfactant is substantially the only surfactant present in the fluid.

9. A method as recited in claim 1 wherein a water insoluble nonionic surfactant selected from the group consisting of ethoxylated alkanols and ethoxylated alkylphenols is also present in the surfactant fluid in an amount sufficient to stabilize the phase thereof.

10. A method as recited in claim 1 wherein the surfactant is said ethoxylated and sulfated surfactant and M$^+$ is a monovalent cation selected from the group consisting of sodium, potassium, lithium and ammonium.

11. A method as recited in claim 10 wherein R is a C$_{10}$ to C$_{20}$ alkyl.

12. A method as recited in claim 10 wherein R is alkylaryl consisting of benzene, toluene, or xylene having attached thereto a C$_7$ to C$_{15}$ alkyl group.

13. A method as recited in claim 10 wherein R' is ethylene.

14. A method as recited in claim 10 wherein x is from 2.5 to 8.0.

* * * * *